(12) United States Patent
Hollenbeck et al.

(10) Patent No.: US 11,022,432 B2
(45) Date of Patent: Jun. 1, 2021

(54) MONITORING THE SCAN VOLUME OF A 3D SCANNER

(71) Applicant: 3SHAPE A/S, Copenhagen K (DK)

(72) Inventors: Karl-Josef Hollenbeck, København Ø (DK); Henrik Öjelund, Copenhagen Ø (DK); Rasmus Kjær, København K (DK)

(73) Assignee: 3SHAPE A/S, Kobenhaven K (DK)

( * ) Notice: Subject to any disclaimer, the term of this patent is extended or adjusted under 35 U.S.C. 154(b) by 0 days.

(21) Appl. No.: 16/485,919

(22) PCT Filed: Feb. 14, 2018

(86) PCT No.: PCT/EP2018/053647
§ 371 (c)(1),
(2) Date: Aug. 14, 2019

(87) PCT Pub. No.: WO2018/149861
PCT Pub. Date: Aug. 23, 2018

(65) Prior Publication Data
US 2020/0041260 A1 Feb. 6, 2020

(30) Foreign Application Priority Data
Feb. 15, 2017 (DK) .............................. PA201770099

(51) Int. Cl.
G01B 11/245 (2006.01)
A61C 9/00 (2006.01)
G05B 19/401 (2006.01)
H04N 13/254 (2018.01)
G06T 7/246 (2017.01)
(Continued)

(52) U.S. Cl.
CPC ............ *G01B 11/245* (2013.01); *A61C 9/006* (2013.01); *G05B 19/401* (2013.01); *G06T 7/0016* (2013.01); *G06T 7/246* (2017.01); *G06T 7/97* (2017.01); *G06T 17/00* (2013.01); *H04N 13/254* (2018.05); *H04N 13/296* (2018.05);
(Continued)

(58) Field of Classification Search
None
See application file for complete search history.

(56) References Cited

U.S. PATENT DOCUMENTS 8,363,288 B2    1/2013  Yang et al.
2003/0231793 A1* 12/2003 Crampton .......... G01B 11/2518
                                                 382/154
(Continued)

FOREIGN PATENT DOCUMENTS

CN    101668104 A    3/2010
CN    104345687 A    2/2015
(Continued)

OTHER PUBLICATIONS

International Search Report (PCT/ISA/210) dated May 14, 2018, by the European Patent Office as the International Searching Authority for International Application No. PCT/EP2018/053647.
(Continued)

*Primary Examiner* — Edemio Navas, Jr.
(74) *Attorney, Agent, or Firm* — Buchanan Ingersoll & Rooney PC

(57) ABSTRACT

Disclosed is 3D scanning using a 3D scanner configured for detecting when the scanned object is at rest in the scan volume of the 3D scanner.

18 Claims, 5 Drawing Sheets

(51) Int. Cl.
  *G06T 7/00* (2017.01)
  *H04N 13/296* (2018.01)
  *G06T 17/00* (2006.01)

(52) U.S. Cl.
  CPC ............... *G05B 2219/37558* (2013.01); *G06T 2207/10012* (2013.01); *G06T 2207/30036* (2013.01)

(56) References Cited

U.S. PATENT DOCUMENTS

| | | |
|---|---|---|
| 2013/0250379 A1 | 9/2013 | Rigazio et al. |
| 2014/0147011 A1 | 5/2014 | Yang |
| 2016/0008111 A1 | 1/2016 | Jumpertz |
| 2016/0150217 A1* | 5/2016 | Popov .................. H04N 13/257 348/48 |
| 2016/0151978 A1* | 6/2016 | Lin ....................... B29C 64/106 264/40.7 |

FOREIGN PATENT DOCUMENTS

| | | | |
|---|---|---|---|
| CN | 105584042 A | | 5/2016 |
| EP | 1882895 A1 | | 1/2008 |
| GB | 2536493 A | | 9/2016 |
| JP | 2003244531 A | * | 8/2003 |
| JP | 2003244531 A | | 8/2003 |

OTHER PUBLICATIONS

Written Opinion (PCT/ISA/237) dated May 14, 2018, by the European Patent Office as the International Searching Authority for International Application No. PCT/EP2018/053647.

First Office Action dated Sep. 29, 2020, by the Chinese Patent Office in corresponding Chinese Patent Application No. 2018800251769, and an English Translation of the Office Action. (35 pages).

Office Action (Second Office Action) dated Apr. 2, 2021, by the Chinese Patent Office in corresponding Chinese Patent Application No. 201880025176.9, and an English Translation of the Office Action. (22 pages).

* cited by examiner

MONITORING THE SCAN VOLUME OF A 3D SCANNER

FIELD

The disclosure relates to monitoring a scan volume of a 3D scanner. More particularly, the disclosure relates to monitoring the scan volume and automatically initiating scanning of an object placed in the scan volume.

BACKGROUND

When an object is 3D scanned using an optical method, a digital 3D representation of the object can be derived from a series of 2D images each providing surface topography information for a portion of the object surface.

3D scanning may be based on several optical detection techniques, such as triangulation or focus scanning.

Many triangulation 3D scanners use a laser beam to probe the object surface and exploit a 2D camera to look for the location of the reflection of the laser beam. Depending on how far away the laser strikes a surface, the laser beam appears at different places in the camera's field of view. This technique is called triangulation because the point where the laser beam impinges on the surface, the camera and the light source together form a triangle. Topography information for a larger portion of the object surface is recorded by sweeping the laser beam across the object. A patterned probe light beam illuminating an area of e.g. several square centimeters, instead of a single laser dot, may be used to speed up the acquisition process.

Several types of 3D scanners are commercially available, such as the D2000 scanner from 3shape A/S.

As the scanner technology matures the time required to manually interact with the 3D scanner becomes comparable with the actual scan time. It remains a problem to provide a 3D scanner and a scanning method where the user interaction is made faster and more efficient.

SUMMARY

According to an embodiment, a 3D scanner for scanning objects placed in the scan volume of the 3D scanner is disclosed. The 3D scanner comprises:
an optical scanning unit configured for recording geometry data of an object placed in the scan volume, the optical scanning unit comprising a light source arranged to project a beam of probe light into the scan volume and an image acquisition unit arranged to record 2D images of light received from the object placed in the scan volume; and
a control unit comprising a data processor and a non-transitory computer readable medium encoded with a computer program product comprising readable program code being executable by the processor to cause the processor to:
detect movement of the object in the scan volume by analyzing monitoring data acquired for the object at different points in time,
initiate 3D scanning when the object is determined to be at rest in the scan volume, and
generate a digital 3D representation of the object from the recorded geometry data.

According to an embodiment, a method for controlling a 3D scanner for scanning objects placed in a scan volume of the 3D scanner is disclosed. The method includes:
monitoring the scan volume to determine whether or not an object is at rest in the scan volume; and
executing instructions for 3D scanning the object when it is found that the object is at rest in the scan volume.

In an embodiment, the readable program code is executable by the processor and is configured to cause the processor to:
acquire a monitoring data at least for a foreign object, present in the scan volume, at different points in time;
detect movement at least of the foreign object present in the scan volume by analyzing the monitoring data acquired at least for the foreign object at different points in time; and
prevent the initiation of 3D scanning of the object when the foreign object is determined to be in motion in the scan volume.

According to an embodiment, a method for controlling a 3D scanner is disclosed. The method includes
monitoring the scan volume to determine whether a foreign object placed in the scan volume is in motion, where the monitoring comprises recording monitoring 2D images using a 2D image sensor of the 3D scanner and analyzing the recorded 2D images; and
executing instructions for preventing 3D scanning of the object when it is determined that the foreign object is in motion within the scan volume.

According to an embodiment, a method for 3D scanning objects in a scan volume of a 3D scanner is disclosed. The method includes:
placing the object in the scan volume of a 3D scanner according to any of the disclosed embodiments,
executing the processor executable instructions for monitoring the scan volume to determine whether or not the object is at rest in the scan volume; and
executing the processor executable instructions for 3D scanning the object when it is found that the object is at rest.

Some steps of the method described above and in the following may be implemented in software and carried out on a data processing system or other processing means caused by the execution of computer-executable instructions. The instructions may be provided as a computer program product loaded in a memory of the data processing system, such as a RAM memory unit, from a computer readable storage medium or from another computer via a computer network. Alternatively, the described steps may be implemented by hardwired circuitry instead of software or in combination with software.

In some embodiments, the computer program product comprises instructions for initiating 3D scanning when the object is found to be at rest in the scan volume.

According to an embodiment, a 3D scanner is disclosed. The 3D scanner includes
an optical scanning unit configured for recording geometry data of an object arranged in a scan volume of the 3D scanner, the optical scanning unit comprising a light source arranged to project a beam of probe light into the scan volume and an image acquisition unit arranged to record 2D images of light received from objects placed in the scan volume; and
a control unit comprising a data processor and a non-transitory computer readable medium encoded with a computer program product comprising readable program code being executable by the processor to cause the processor to:
acquire a monitoring data at least for a foreign object, present in the scan volume, at different points in time, detect movement at least of the foreign object present in the scan volume by analyzing the monitoring data acquired for the foreign object at different points in time, and prevent initiation of 3D scanning of the object when the foreign object is determined to be in motion in the scan volume.

The foreign object is different from the object to be scanned and the foreign object is usually temporarily present in the scan volume typically prior to initiation of 3d scanning, such as during positioning of the object in the scan volume. In context of the disclosure, the foreign object may include an operator's hand while the object is being placed in the scan volume. Alternatively, the foreign object may include a robotic arm that is configured to position the object in the scan volume for scanning. Typically, the determination of motion of the foreign object is performed prior to the determination whether the object is at rest.

In an embodiment, the readable program code is executable by the processor and is configured to cause the processor to:

detect movement of the object in the scan volume by analyzing a monitoring data acquired for the object at different points in time;

initiate 3D scanning when the object is determined to be at rest in the scan volume; and generate a digital 3D representation of the object from the recorded geometry data.

Because initiation of scanning for generating a digital 3D representation of the object from the recorded geometry data needs to be avoided when the foreign object is still present in the scan volume. Therefore, according to an embodiment, preventing the initiation of the 3D scanning of the object comprises the readable program code that is executable by the processor is configured to cause the processor to prevent the initiation of 3D scanning of the object when the object is determined to be at rest in the scan volume and the foreign object is determined to be motion in the scan volume. In other words, the 3D scanning of the object is may be initiated when the foreign object is absent from, i.e. not present in, the scan volume even if the determination concludes that the object is at rest.

In context of the disclosure, the scan volume may be defined by a cone that represents field of view of image acquisition unit. In scenarios where the image acquisition unit includes more than one image sensor, then the scan volume includes entire or at least a part of a field of view that is common across the more than one image sensor, i.e an overlapping field of view.

Monitoring the scan volume may include recording monitoring 2D images of the object and/or foreign object using a 2D image sensor of the 3D scanner and analyzing the recorded 2D images. In one embodiment, the monitoring data comprises monitoring 2D images of the object and foreign object recorded at different points in time when the foreign object is present in the scan volume. In another embodiment, the monitoring data comprises monitoring 2D images of the object recorded at different points in time when the foreign object is absent from the scan volume.

The analyzing the monitoring data may include comparing the monitoring 2D images recorded at different points in time, for example by comparing pixel values of pixels in the monitoring 2d images. In one embodiment, the object is determined to be at rest in the scan volume when a difference between the compared pixel values is below a first predefined threshold value. In another embodiment, the foreign object is determined to be in motion in the scan volume when a difference between the compared pixel values is above a second predefined threshold value. In different implementation, the first predefined threshold value and the second predefined threshold value may be same or different. Thus, one non-limiting illustrative way is to compute a difference indicator by subtracting intensity values of corresponding pixels in the monitoring 2D images and determining whether the difference is below a predetermined threshold intensity value. Another non-limiting illustrative way may include comparing image intensity histogram of the monitoring 2D images and determining whether the difference is below a predetermined threshold.

Monitoring 2D images may include two or more separate 2D images that are recorded at different points in time. During analysis, these recorded 2D images are compared for determination of whether the object is at rest or the foreign object is in motion. Additionally or alternatively, the monitoring 2D images may include one or more composite 2D images that include an average representation of a predefined number of successive images that are recorded at different points in time during the monitoring stage, i.e. prior to initiation of the scanning. The composite image may be generated by aligning the predefined number of images and calculating a pixel value for a specific pixel by either utilizing the pixel value from one of the images selected from the predefined number of successive images or averaging, from the predefined number of successive images, pixel values for the specific pixel. During analysis, these composite 2D images are compared for determination of whether the object is at rest or the foreign object is in motion. In another embodiment, a comparison can be made between a composite image and a non-composite 2D image, which is simply a 2D image recorded at a specific point in time during the monitoring stage. Utilizing such composite images may be useful for example to reduce noise from the recorded monitoring 2D images and making initiation of automatic scanning more reliable. The readable program code executable by the processor may be configured to cause the processor to generate such composite images. The readable program code may be further configured to compare i) two composite monitoring 2D images, and/or ii) a composite monitoring 2D image with a non-composite monitoring 2D image, and/or iii) two non-composite monitoring 2D images.

The control unit may be configured to set a time interval between different points in time at which monitoring data is recorded. The time interval is preferably sufficiently short to avoid introducing unnecessary long waiting times e.g. for initiation of the 3D scanning, and may still sufficiently long to avoid that the 3D scanning is initiated while the operator is still in the process of placing the object in the scan volume. For example, a single 2D image of the object may often be obtained within much less than 100 msec and the following analysis can also be handled quickly by a data processing system. The monitoring of the scan volume and the automatic initiation of the scan procedure may thus be much faster than a human operator can interact with a user interface of the 3D scanner.

In one embodiment, detecting whether or not the object moves in the scan volume may involve determining whether or not the position and/or orientation of the object in the scan volume changes over time. Predetermined ranges for the maximum allowed variation in position and/or orientation while still considering the object to be at rest may be defined as well as the required time interval during which the object must be within such predetermined ranges.

The monitoring of the scan volume during the procedure of placing an object in the 3D scanner, provides that the 3D scanning may be initiated automatically once the operator has placed the object at rest in the scan volume without the operator needing to interact with the 3D scanner control system to inform that the object is ready to be scanned. Since there is no need for the operator to turn to e.g. at computer screen for entering a command for initiating the scanning, the scan procedure can be initiated quickly. The scanning procedure is made more automatic with the operator only needing to place the object in the scan volume and remove it after the scanning. In a scan sequence where several objects are sequentially scanned the operator just needs to replace a scanned object with the next object thus reducing the overall time of the scan procedure significantly.

The computer program product may comprise instructions for detecting that a scanned object has been removed from the scan volume and that a new object has been placed in the 3D scanner and is at rest in the scan volume, and for 3D scanning the new object. Monitoring the scan volume to detect that the scanned object is removed may be based on tracing the movement of the scanned object out of the scan volume or by registering that the scan volume at some point in time after a scanning is empty before an object again is found in the scan volume.

The new object may in principle be identical to the already scanned object e.g. if the operator was not satisfied with the quality of a first scanning of the object.

The monitoring data may preferably express the position and/or orientation of the object in the scan volume. The 3D scanner is then capable of detecting movement of the object in the scan volume by analysis of the monitoring data. The analysis may also be directed to determining whether or not there is an object in the scan volume.

In some embodiments, the optical scanning unit comprises a light source arranged to project a beam of probe light into the scan volume. I.e. when the object is scanned, the probe light is projected onto the object. The probe light beam may comprise a pattern, such as a line pattern consisting of a number of parallel lines.

In some embodiments, the optical scanning unit comprises an image acquisition unit arranged to record 2D images of light received from objects arranged in the scan volume and/or from the foreign object present in the scan volume.

In some embodiments, the monitoring data comprises monitoring 2D images recorded at different points in time. Monitoring the scan volume may then comprise recording one or more monitoring 2D images for different points in time and analyzing that includes comparing and/or analyzing the recorded monitoring 2D images.

The computer program product then preferably comprises instructions for analyzing the one or more monitoring 2D images to derive the monitoring data and for analyzing the monitoring data to detect whether the object and/or foreign object is moving.

In the context of the disclosure, the phrase "2D Image" may be used both in relation to cases where a coherent region of the object surface imaged in the 2D image is illuminated by probe light or ambient light and in relation to cases where the object and/or foreign object is illuminated by a structured probe light beam. When a structured probe light beam is applied, the 2D image may only contain geometry data for the portion or portions of the object surface where probe light actually impinges on the object surface. I.e. the 2D image may have dark sections with little or no data from the surface. E.g. for a probe light pattern consisting of a number of parallel lines, the 2D image will provide data from the object surface illuminated by the lines only and no data will be present in the 2D image from sections of the object surface between the lines of the probe light pattern.

The 3D scanner may e.g. have two or more 2D cameras arranged to image the object and/or foreign object from different angles such that movement can be detected for different directions in the scan volume and/or two or more monitoring 2D images may be obtained substantially simultaneously using the same 2D camera. The latter situation may e.g. be used in a focus scanner where the focal plane is swept along the optical axis covering the scan volume effectively instantaneously or when a triangulation 3D scanner records a low-resolution digital 3D representation of the object within a time which is substantially shorter than the time between two successive points in a sequence of times. The recording of several monitoring 2D images for each point in time should preferably be accomplished within a fraction of the time between two successive points in the sequence of points in time. For example, the recording of monitoring 2D images for each point in time may be accomplished within one tenth of the time separating two successive points in time.

In some embodiments, analyzing the monitoring data comprises comparing the monitoring 2D images recorded at different points in time. When there is no change between two or more successive monitoring 2D images, or when the change is below a predefined maximum value, it is concluded that the object is at rest.

In some embodiments, the image acquisition unit records both the monitoring 2D images of the object and/or foreign object recorded during the monitoring of the scan volume and scanning 2D images of the object recorded during the 3D scanning. This provides the advantage that the 3D scanner can be manufactured using fewer components than when separate image acquisition units are used for recording the geometry data and the monitoring data.

In some embodiments, the image acquisition unit comprises one 2D camera which records at least part of the monitoring 2D images and at least part of the scanning 2D images. Using the same 2D camera to record the 2D images used for both the monitoring of the scan volume and the 2D images for determining the topography for the scanned object provides that fewer components are needed to construct the 3D scanner which accordingly can be made more compact and at a reduced cost.

The 3D scanner is preferably configured for determining the topography of the scanned object from the recorded geometry data, e.g. by generating a digital 3D representation of the object expressing the topography of the object. I.e. generating a digital 3D representation of the object can be said to determine the topography of the object and the computer program product can be said to comprise instructions for deriving the topography of the object from the recorded geometry data.

This can be realized in a separate control unit receiving 2D images and/or geometry data from the 3D scanner or by including appropriate instructions in the computer program product of the 3D scanner's control system.

The geometry data recorded during the 3D scanning can be derived from the recorded scanning 2D images by executing computer implemented algorithms configured for performing such analysis.

Ambient light may be used to illuminate the scan volume and any object placed therein during the monitoring. i.e. in some embodiments, ambient light is used to illuminate the object when the monitoring data such as monitoring 2D images are recorded. In that case the monitoring 2D images recorded capture ambient light reflected from the object placed in the scan volume and/or from the foreign object present in the scan volume.

The 3D scanner can be configured to allow the object and/or foreign object to be illuminated by ambient light when recording the monitoring 2D images by having an open design allowing the ambient light to reach the scan volume. In some embodiments, the illumination unit is inactive or the intensity of the probe beam is reduced during the recording of the monitoring 2D images.

In some embodiments, analyzing the monitoring data comprises deriving information relating to the position and/or orientation of the object in the scan volume from the recorded monitoring data and comparing the information derived for monitoring data recorded at different points in time. If the information derived from successive monitoring 2D images differ this indicates that the object is not at rest. The derived information may comprise the orientation and/or position of an edge or structure of the object, or of the entire object.

When there is only one monitoring 2D image for each point in time the orientation and/or position of the object in the scan volume may be derived directly for each monitoring 2D image.

In some embodiments, the comparing comprises analyzing the monitoring 2D images, such as analyzing the images using an image analysis algorithm such as a feature recognition algorithm or edge detection algorithm.

Image analysis algorithms of the computer program product may be applied to identify at least the boundaries of the object placed in the scan volume.

The object may be placed on a sample holder having a color which is not normally found in the scanned object, such as black for dental applications. When a monitoring 2D image containing color information is recorded, the boundary of the object can be identified using this color information.

In some embodiments, analyzing the monitoring data comprises generating monitoring digital 3D representations of the object and/or foreign object from the monitoring data acquired for different points in time and comparing the relative arrangement of the generated monitoring digital 3D representations.

The computer program product may comprise processor executable instructions for:
  generating a monitoring digital 3D representation of the object and/or foreign object from the monitoring data, such as from a number of monitoring 2D images of the object and/or foreign object recorded at the same point in time, and
  detecting any relative movement of two or more monitoring digital 3D representations generated from monitoring data recorded at different points in time, e.g. by comparing the arrangement of the different monitoring digital 3D representations in a common coordinate system, such as in the coordinate system of the 3D scanner.

If the digital 3D representations are expressed in the same coordinate system, such as in the coordinate system of the 3D scanner, any movement can be detected as the displacement required to align two monitoring digital 3D representations. If the digital 3D representations immediately are aligned without any need for displacement the object is at rest. The displacement can be determined using e.g. an Iterative Closest Point (ICP) algorithm to align the digital 3D representations.

The ICP algorithm is employed to minimize the difference between two clouds of points. ICP can be used to reconstruct a digital 3D representation of an object from partial digital 3D representations of the object or for determining the transformation which aligns two digital 3D representations of the same surface. The algorithm is conceptually simple and is commonly used in real-time. It iteratively revises the transformation, i.e. translation and rotation, needed to minimize the distance between the points of the two point clouds. The inputs are points from two raw point clouds (e.g. the partial digital 3D representations), an initial estimation of the transformation and the criteria for stopping the iteration. The output is a refined transformation. Essentially the algorithm steps are:
  1. Associate points by the nearest neighbor criteria.
  2. Estimate transformation parameters using a mean square cost function.
  3. Transform the points using the estimated parameters.
  4. Iterate, i.e. re-associate the points and so on.

The disclosure is not limited to scanning of one object at a time. Several objects may be arranged in the scan volume if the size of the objects and scan volume allows for this.

The scan volume may be monitored continuously in the period of time between the 3D scanning of two objects.

When an operator places the object in the scan volume using his hand, the 3D scanning is preferably not initiated before the object is at rest and the hand is out of the scan volume again. When the operator's hand is in the scan volume, the monitoring 2D images may also contain data relating to the hand, i.e. its position and/or orientation in the scan volume. The instructions of the computer program product then provide that any movement of the operator's hand in the scan volume is detected by analysis of monitoring 2D images recorded for different points in time. For example, a comparison between successive monitoring 2D images will not only show whether the object is a rest but also show if the operator's hand is present and moving in the scan volume.

According to an embodiment, a computer program product is disclosed. The computer program product is embodied in a non-transitory computer readable medium, where the computer program product includes computer readable program code being executable by a hardware data processor to cause the hardware data processor to
  detect movement of an object placed in a scan volume of a 3D scanner by analyzing monitoring data acquired for the object at different points in time;
  determine whether the object is at rest in the scan volume;
  initiate 3D scanning when the object is determined to be at rest in the scan volume;
  generate a digital 3D representation of the object from geometry data recorded during the 3D scanning; and
  visualize, such as by displaying on a screen, the generated digital 3D representation.

According to an embodiment, a computer program product is disclosed. The computer program product is embodied in a non-transitory computer readable medium, where the computer program product includes computer readable program code being executable by a hardware data processor to cause the hardware data processor to
  acquire a monitoring data at least for a foreign object, present in a scan volume of a 3D scanner, at different points in time;
  detect movement at least of the foreign object present in the scan volume by analyzing the monitoring data acquired at least for the foreign object at different points in time; and prevent initiation of 3D scanning of the object when the foreign object is determined to be in motion in the scan volume.

The computer readable program code that is executable by the hardware data processor may also cause the hardware data processor to record monitoring data by capturing ambient light reflected by the object placed in the scan volume and/or the foreign object present in the scan volume.

The computer program product may include further instructions that relate to any or all of the steps required to perform the disclosed method.

Instead of operating by the triangulation technique, the 3D scanner may be configured for utilizing focus scanning, where a digital 3D representation of the scanned object is reconstructed from in-focus 2D images recorded at different focus depths. The focus scanning technique can be performed by generating a probe light and transmitting this probe light towards the scanned object such that at least a part of the object is illuminated. The scanner has focusing optics arranged to define a relatively narrow focal plane. Light returning from the object is transmitted towards a camera and imaged onto an image sensor in the camera by means of an optical system, where the image sensor/camera comprises an array of sensor elements. The position of the focus plane on/relative to the object is varied by means of the focusing optics while in-focus 2D images are obtained from/by means of said array of sensor elements.

Based on the in-focus 2D images, the in-focus position(s) of each of a plurality of the sensor elements or each of a plurality of groups of the sensor elements may be determined for a sequence of focus plane positions. The in-focus position can then be calculated e.g. by determining the light oscillation amplitude for each of a plurality of the sensor elements or each of a plurality of groups of the sensor elements for a range of focus planes. From the in-focus positions, the digital 3D representation of the object can be derived.

The disclosure relates to different aspects including the method and 3D scanner described above and in the following, and corresponding methods and 3D scanners, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a 3D scanner for scanning objects placed in a scan volume of the 3D scanner, wherein the 3D scanner comprises:
 a light source arranged to project a beam of probe light into the scan volume;
 an image acquisition unit comprising at least one 2D image sensor arranged to record a series of 2D images of an object arranged in the scan volume;
 a control unit comprising a data processing unit and a non-transitory computer readable storage medium encoded with a computer program product comprising processor executable instructions for operating the 3D scanner in a monitoring mode and for activating a scanning mode of the 3D scanner when the monitoring has determined that an object is at rest in the scan volume.

In some embodiments, the monitoring mode is configured to provide that the 2D image sensor records at least one monitoring 2D image from the scan volume for each point in time in a series of points in time. The recorded monitoring 2D images can then be analyzed to determine whether or not an object is present and at rest in the scan volume.

In some embodiments, the scanning mode is configured to provide that 2D the image sensor records scanning 2D images while the object arranged in the scan volume is illuminated by the probe light. A digital 3D representation of the scanned object can then be generated from the recorded scanning 2D images.

Disclosed is a 3D scanner for scanning an object placed in a scan volume of the 3D scanner to record a digital 3D representation of the object, wherein the 3D scanner is configured for monitoring the scan volume and for initiating 3D scanning of the object when the monitoring detects that an object is placed at rest in the scan volume, the 3D scanner comprising:
 at least one light source arranged to project a probe light beam onto the object;
 an image acquisition unit arranged to capture light received from objects arranged in the scan volume;
 a control unit comprising a data processing unit and a non-transitory computer readable storage medium encoded with a computer program product comprising processor executable instructions for:
  i. receiving monitoring data expressing the orientation and position of the object in the scan volume;
  ii. determining whether or not the object is at rest by analyzing the monitoring data received for different points in time; and
  iii. initiating 3D scanning of the object when the object is found to be at rest.

The computer program product preferably also comprises instructions for executing the 3D scanning of the object and for generating a digital 3D representation of the object from geometry data derived from one or more 2D images recorded using the image acquisition unit during the 3D scanning.

The control unit can be realized e.g. by a computer comprising the processor and non-transitory computer readable storage medium.

Disclosed is a 3D scanner for scanning objects placed in a scan volume of the 3D scanner, wherein the 3D scanner comprises:
 a monitoring unit configured for monitoring the scan volume to determine whether or not an object is at rest in the scan volume;
 an optical scanning unit configured for 3D scanning objects arranged in the scan volume; and
 a control unit configured for executing a scan procedure for 3D scanning the object using the optical scanning unit when the monitoring unit has detected an object at rest in the scan volume.

In some embodiments, the monitoring unit operates by recording a series of monitoring 2D images of the object in the sample volume. The recorded monitoring 2D images may then be compared to detect whether the object's orientation and/or position in the scan volume changes from one monitoring 2D image to another. The comparing may comprise analyzing the monitoring 2D images using image analysis algorithms, such as analyzing the monitoring 2D images using a feature recognition algorithm or edge detection algorithm. Such algorithms may be part of a computer program product comprising processor executable instructions for performing the steps of the algorithm, where the instructions are encoded on a non-transitory computer readable storage medium and executed by a processor. The processor and storage medium may be parts of the control unit.

In some embodiments, the monitoring unit and the scanning unit shares at least one 2D image sensor arranged to record both monitoring 2D images for the object and/or the foreign object for the monitoring of the scan volume and 2D images for the 3D scanning of the object for generation of the 3D representation of the object.

In some embodiments, the monitoring unit comprises at least one photodetector, such as a photodiode, and the monitoring operates by detecting a change in the intensity of light received by the photodetector when an object is placed in the 3D scanner.

The photodetector may be arranged such that the intensity of ambient light received by the photodetector is reduced when the object supporting structure is arranged in the 3D scanner. I.e. monitoring the scan volume comprises recording values from a photodetector arranged such that either the object or the object supporting structure of the 3D scanner at least partly obstructs the acceptance cone of the photodetector when the object supporting structure is placed in the 3D scanner. This may e.g. be realized by placing the photodetector behind the object supporting structure when the object supporting structure is mounted in the 3D scanner. This allows for determining whether an object is placed on the object supporting structure, thereby indicating that the scan volume is not empty.

In some embodiments, the monitoring unit comprises at least one monitoring light source arranged to emit a monitoring beam towards the photodetector and such that the path of the monitoring beam towards the photodetector is blocked when the object is placed in the scan volume.

In some embodiments, the monitoring unit comprises a weight sensor arranged to record when an object is placed on an object supporting surface in the 3D scanner.

In one embodiment, a method for detecting presence of an object and/or a foreign object in the scan volume is disclosed. The method includes acquiring a monitoring data comprising at least one monitoring 2D image of the scan volume; and detecting presence of the object and/or foreign object in the scan volume based on analyzing the at least one acquired 2D image with respect to an information about an empty scan volume.

In another embodiment, the control unit includes a data processor and a non-transitory computer readable medium encoded with the computer program product comprising readable program code being executable by the processor may further cause the processor to acquire a monitoring data comprising at least one monitoring 2D image of the scan volume; and detect presence of the object and/or foreign object in the scan volume based on analyzing the at least one acquired 2D image with respect to the information about an empty scan volume.

The analyzing may be performed using one of embodiments disclosed earlier, for example by comparing pixel-by-pixel value of the at least one acquired monitoring 2D image with the information; and indicating presence of the object and/or foreign object when a difference in pixel values is beyond a predefined threshold value. The information may be represented by a 2D image of an empty scan volume and stored in a memory that is accessible by the control unit.

The above embodiment may be used as a pre-step to determining whether the foreign object is in motion.

BRIEF DESCRIPTION OF THE DRAWINGS

The embodiments of the disclosure, together with its advantages, may be best understood from the following illustrative and non-limiting detailed description taken in conjunction with the accompanying figures in which.

DETAILED DESCRIPTION

In the following description, reference is made to the accompanying figures, which show by way of illustration how the invention may be practiced.

Figure 1:
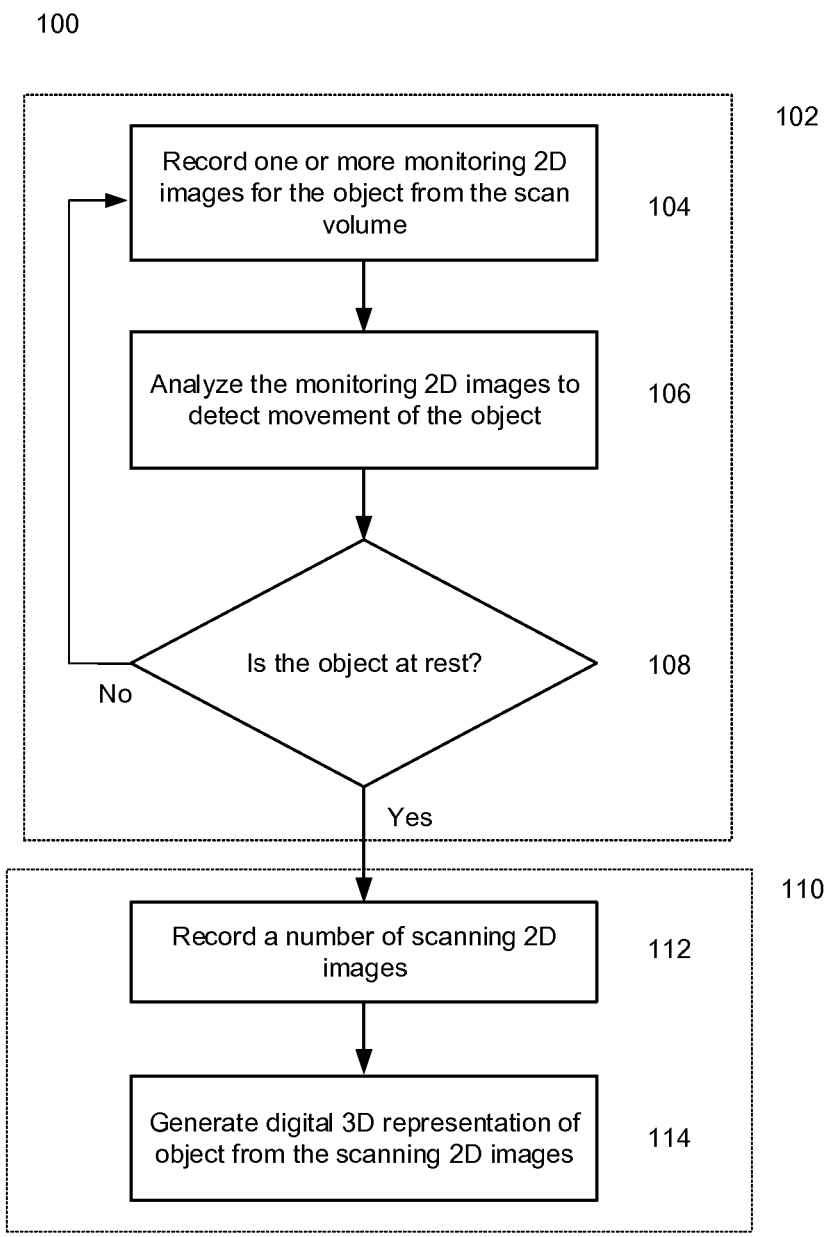
FIG. 1 illustrates a method for generating a 3D representation of the object according to an embodiment.
Figure 5:
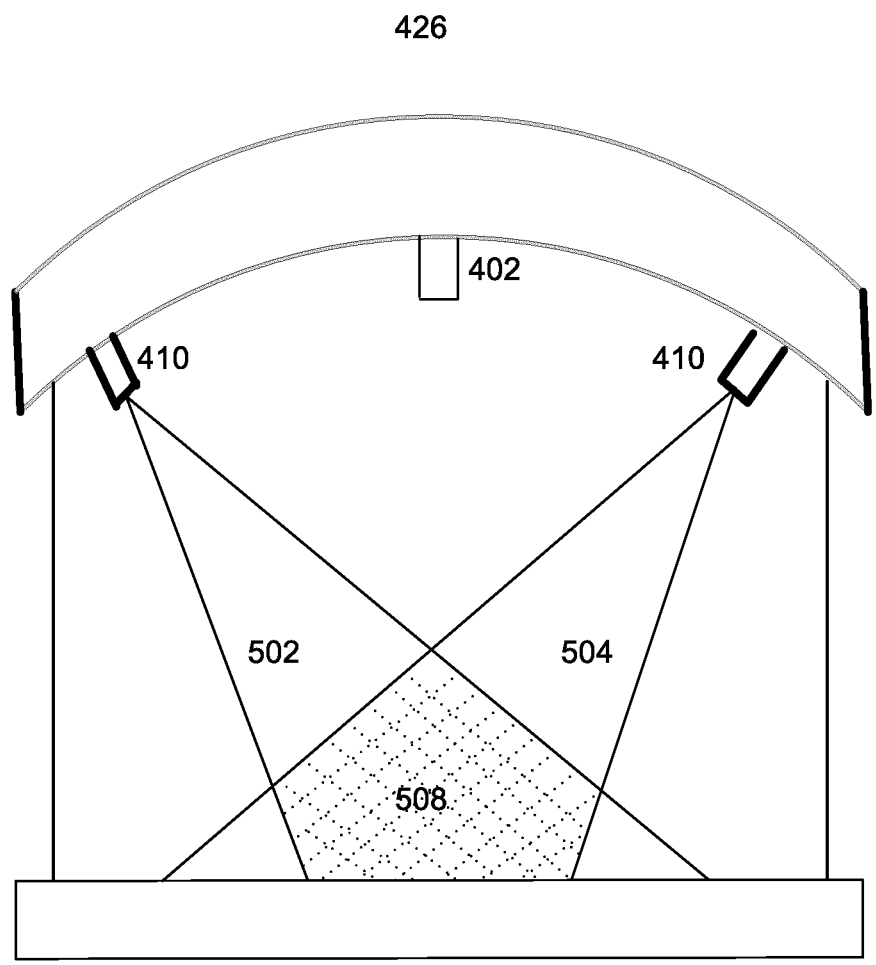
FIG. 5 illustrates a scan volume according to an embodiment.

FIG. 1 illustrates a method (workflow) for generating a 3D representation of the object such as a teeth model according to an embodiment. The 3D scanner is configured to monitor the scan volume (FIG. 5, 508). The workflow 100 includes a monitoring part 102 and a 3D scanning part 110. The monitoring part 102 includes workflow relating to initiation of the 3D scanning process, and the 3D scanning part 110 includes workflow relating to generation of 3D representation of the object.

At 104, a monitoring data comprising one or more monitoring 2D images of the object, which is present in the scan volume is acquired at different points in time. At 106, the monitoring 2D images are analyzed for detection of movement of the object in the scan volume. At 108, a determination is made, whether the object in the scan volume is at rest or in motion. The analysis and determination may be handled by a control unit of the 3D scanner which executes instructions for the analysis and comparison. If the object is determined to be in motion, a further one or more monitoring 2D images of the object are recorded in an iterative way until the object is determined to be at rest at 108. If the object is determined to be at rest, then the workflow proceeds to the scanning part 110, i.e. 3D scanning of the object is initiated. At 112, a plurality of scanning 2D images of the object placed in the scan volume is recorded and based on the plurality of the scanning 2D images of the object, a digital 3D representation of the object is generated.

The same image acquisition unit of the 3D scanner may be configured to record both the monitoring 2D images during the monitoring stage and the scanning 2D images during the scanning stage.

Figure 2:
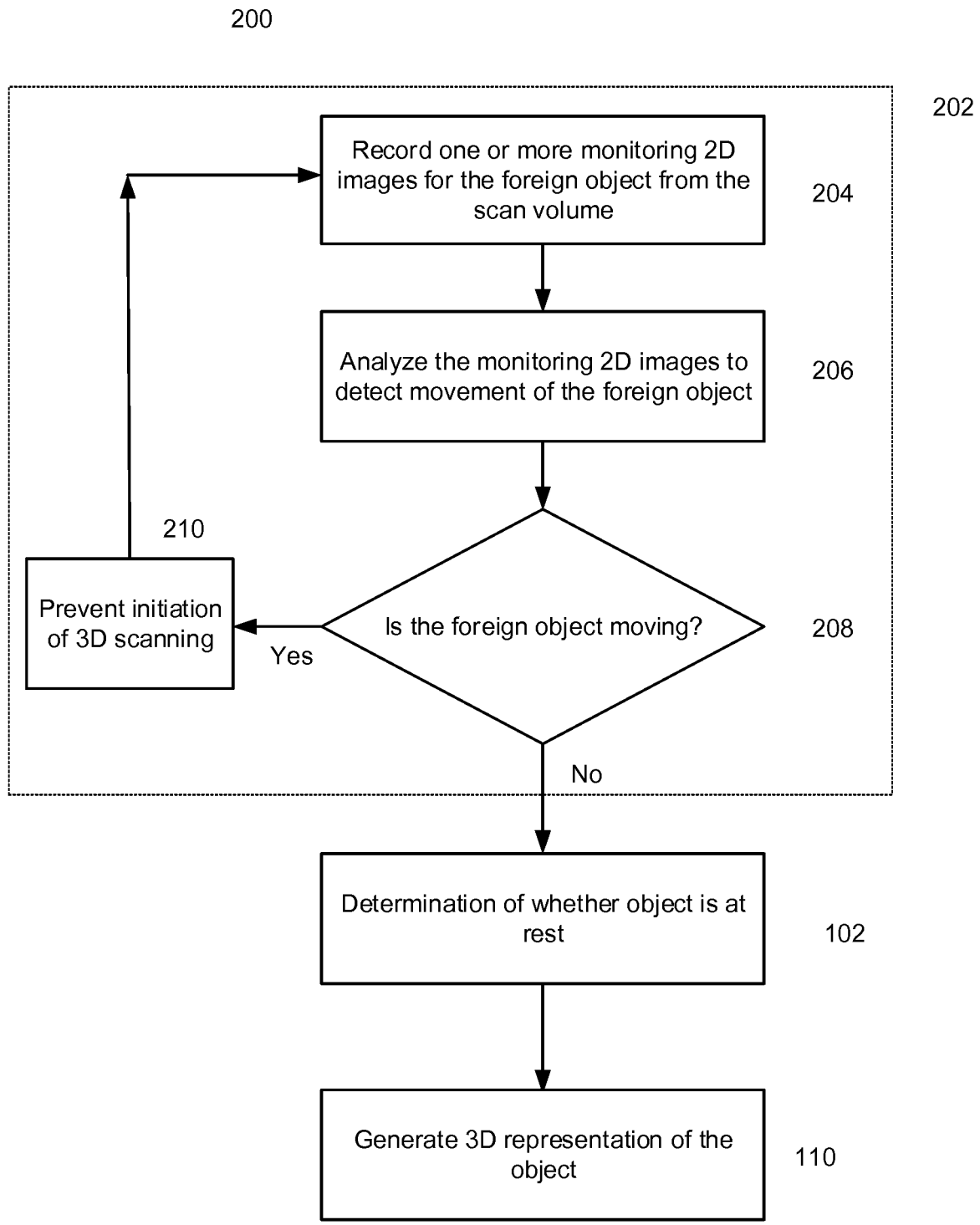
FIG. 2 illustrates a method for generating a 3D representation of the object according to an embodiment.

FIG. 2 illustrates a method for generating a 3D representation of the object according to an embodiment. Typically, a foreign object such as an operator hand is in the scan volume when the object is being positioned in the scan volume. It is useful to avoid initiation of 3D scanning while the foreign object is still in the scan volume. Therefore, a workflow 202 may be used. The workflow includes at 204, a monitoring data comprising one or more monitoring 2D images of at least the foreign object, present in the scan volume, is acquired. Such acquisition of the monitoring data is at different points in time. At 206, the monitoring 2D images are analyzed to detect if a motion of the foreign object in the scan volume is detected. At 208, a determination is made whether the foreign object is in motion. If so, then at 210, initiation of 3D scanning of the object is prevented and further one or more monitoring 2D images are recorded at 204 in an iterative manner until a negative determination is made that the foreign object is in motion.

The analysis and determination may be handled by a control unit of the 3D scanner which executes instructions for the analysis and comparison.

According to an embodiment, the method disclosed in preceding paragraph may further include additional workflow where the negative determination is followed by determining, at 102, whether the object is at rest and at 110, generating a 3D representation of the object. Workflow elements 102 and 110 include steps that are explained earlier in relation to FIG. 1. A combination of these additional workflow elements allow for preventing initiation of the 3D scanning of the object when the object is determined to be at rest in the scan volume and the foreign object is determined to be motion in the scan volume.

Figure 3:
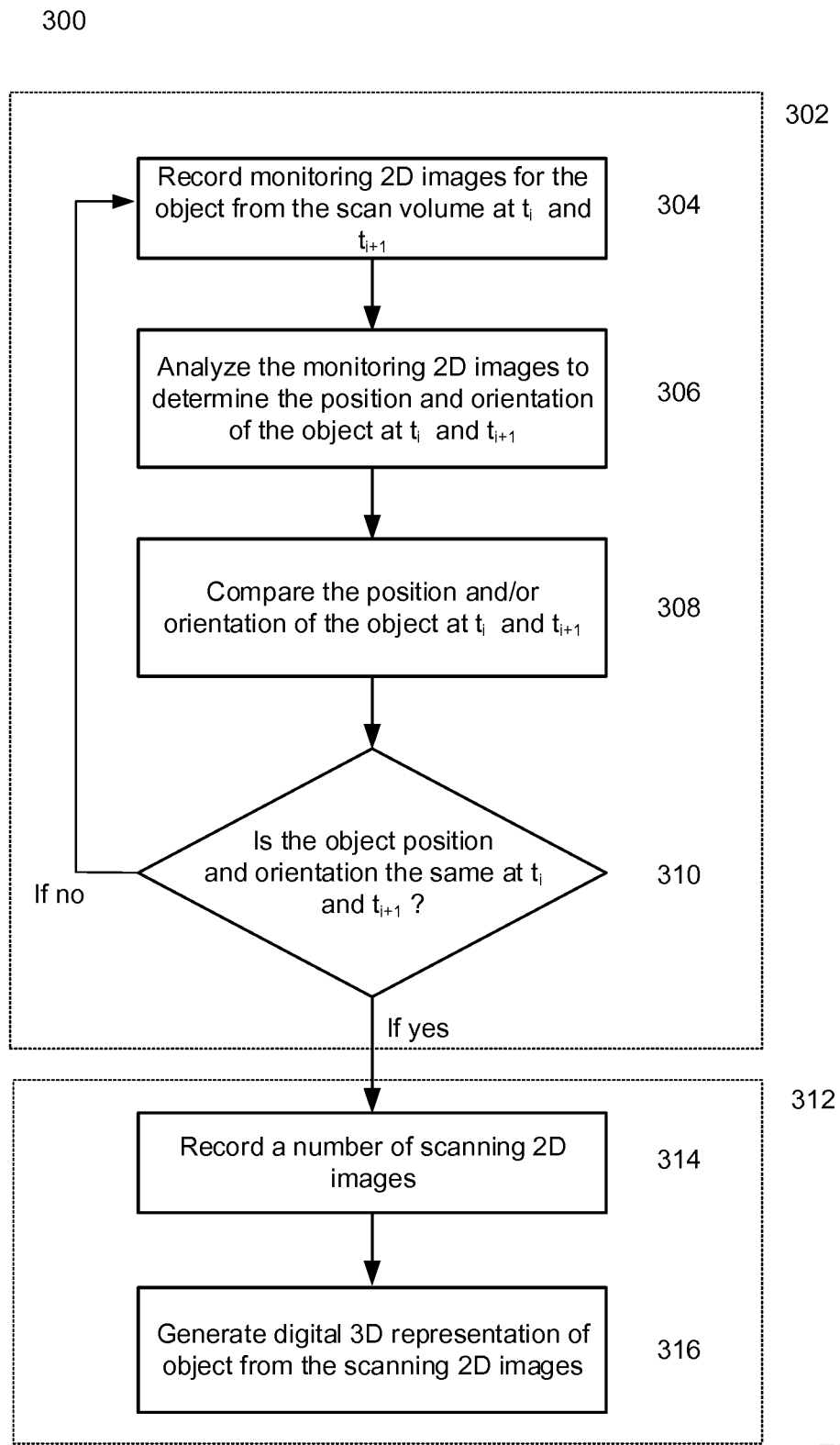
FIG. 3 illustrates a method for generating a 3D representation of the object according to an embodiment.

FIG. 3 illustrates a method for generating a 3D representation of the object according to an embodiment. The work flow 300 includes a monitoring stage 302 and a 3D scanning stage 312.

When the object is in the scan volume of a 3D scanner, such as the 3D scanner illustrated in FIG. 2, the image acquisition unit of the scanner is capable of recording 2D images of the object. During the monitoring, one or more monitoring 2D images are recorded for different times, which may be defined by a sequence of time points ( . . . $t_{i-1}$, $t_i$, $t_{i+1}$ . . . ). In the scanner of FIG. 2, the same image acquisition unit records both the monitoring 2D images and the scanning 2D images.

The scan volume is monitored while the operator moves the object into place in the scan volume. At 304, two or more monitoring 2D images are recorded from the scan volume at different time points $t_i$ and $t_{i+1}$. These monitoring 2D images are then analyzed at 306 to determine the position and orientation of the object. For example the perimeter of the object may be detected in each of the monitoring 2D images.

It may then be determined whether or not the objects is at rest by comparing the position and/or orientation of the object at 308. If there is no change or change within a predefined threshold, it may be concluded that the object is at rest. The analysis and comparison are handled by a control unit of the 3D scanner which executes instructions for the analysis and comparison.

One way to compare two 2D images is to form their difference, either for a single color channel as in grayscale images, or for several as in color images, the latter case resulting in a set of difference images, one for each color channel.

One way to assess sets of difference images for various color channels is to transform colors into another color space, for example hue-saturation-lightness, and then subtract only one or two of the color components in that color space. If only one such component is used, the procedure is equivalent to that for grayscale images.

One way to compute a difference indicator from 2D images is to subtract intensity values of corresponding pixels and form a mean value for all pixels.

One way to detect a change such as an object entering the scanner is to compare the difference indicator against a threshold value. The threshold value can be found from calibration and could be set by the user.

One way to increase the robustness of change detection in 2D images is to consider m images, where m>2, evaluate the m−1 difference images of consecutive images, from the difference indicator for each, and apply a smoothing filter such as a running-average filter. In this way, one spurious image has smaller likelihood of causing a false change detection.

One way to increase detectability is to process several regions of the 2D images separately. For example, when a small object is placed inside the scanner, especially in a small area appearing near the boundary of the 2D images, the overall mean of all pixels of a pair of difference images may be rather small and remain under the threshold value. For the same example, when processing several regions in the same manner as the full images, but individually, at least one region will likely show a difference indicator larger than the threshold, and this can be taken as an indication of change.

If it is found that the object has moved or rotated between $t_i$ and $t_{i+1}$, the monitoring steps 102, 103 and 104 are repeated. This is continued until it is concluded at 310 that the object is at rest and the 3D scanning part 312 of the workflow may be initiated.

In the 3D scanning 312, a number of scanning 2D images are recorded at 314. When the scanner operates e.g. by triangulation a number of scanning 2D images are recorded where the position of the probe light beam on the object surface varies from one image to another.

In step 316, a digital 3D representation of the object is generated from the recorded series of scanning 2D images. This can be done using computer implemented algorithms for e.g. creating partial digital 3D representations of the object from the scanning 2D images and stitching together partial digital 3D representations of the surface obtained from different views. The stitching can be performed using an Iterative Closest Point (ICP) algorithm employed to minimize the difference between the two partial digital 3D representations.

Figure 4:
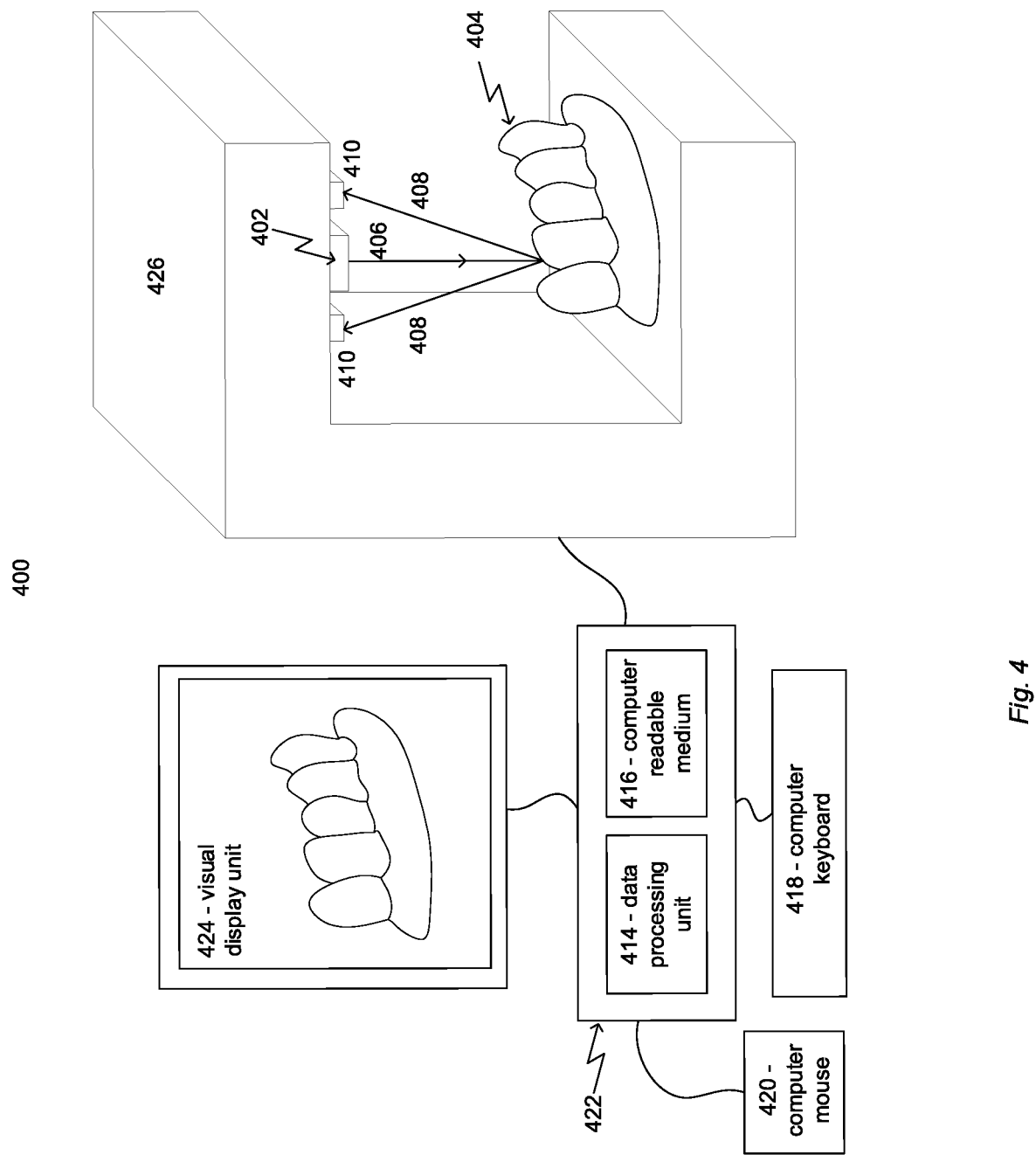
FIG. 4 illustrates a 3D scanner according to an embodiment.

FIG. 4 illustrates a 3D scanner system 400 according to an embodiment.

The 3D scanner contains a 3D scanning unit 426 having an illumination unit 402 configured to provide a beam of probe light 406 which is projected onto the scanned object 404 arranged in the scan volume of the 3D scanner. The illumination unit has a light source, such as a LED or an array of LEDs, arranged to provide the probe light. The probe light may be spatially structured, such as having a checkerboard pattern or line pattern, and may be monochromatic or colored. In this example, the scanned object is a partial teeth model 404. The image acquisition unit, by a non-limiting example, includes two 2D cameras 410 arranged to receive light 408 reflected from the teeth model 404 such that 2D images of the reflected light are recorded.

The 3D scanner may have an optical system configured for guiding the probe light from the illumination unit towards the teeth model arranged in the scan volume and for receiving light reflected from the scanned teeth model and guiding it towards the image acquisition unit.

The control unit 422 includes a data processing unit 414 and a non-transitory computer readable medium 416 encoded with a computer program product with instructions for analyzing monitoring 2D images to determine when the teeth model is at rest in the scan volume and generating a digital 3D representation from the scanning 2D images recorded during the 3D scanning. The non-transitory computer readable medium 416 may also be encoded with a computer program product with instructions for analyzing monitoring 2D images to determine when the foreign object in the scan volume is in motion.

During the monitoring of the scan volume, the control unit 422 is configured to instruct the 3D scanning unit 211 to record one or more monitoring 2D images of the object and/or foreign object using the cameras 410 of the image acquisition unit. The monitoring 2D images may be recorded using ambient light such that the illumination unit 406 is inactive while the monitoring 2D images are recorded. The housing of the illustrated scanning unit is open such that ambient light may illuminate the teeth model 404 when the monitoring 2D image is recorded. The recorded monitoring 2D images of the object are transferred to the control unit 422 where the data processing unit 414, e.g. a microprocessor, is configured to execute instructions for analyzing the monitoring 2D images to determine whether the teeth model is at rest, for example if the teeth model is arranged at the same position and orientation for at least two points in time. When it is determined that the teeth model is at rest, the 3D scanning is initiated. Additionally, the recorded monitoring 2D images of the foreign object are transferred to the control unit 422 where the data processing unit 414, e.g. a microprocessor, is configured to execute instructions for analyzing the monitoring 2D images to determine whether the foreign object is in motion.

During the 3D scanning the control unit 414 is configured to instruct the 3D scanning unit 426 to record a series of scanning 2D images of the teeth model. The recorded scanning 2D images are transferred to the control unit 422 where the digital 3D representation of the teeth model is generated.

When a structured probe light beam is used, the light pattern is detected in the acquired scanning 2D images and well-established projection geometry such as triangulation or stereo is used to derive the 3D coordinates for the teeth model surface illuminated by the bright parts of the pattern. This is done for a sequence of different relative positions of the teeth model 404 and the 3D scanning unit 426.

The control unit may include any device or combination of devices that allows the data processing to be performed. The control unit may be a general purpose computer capable of running a wide variety of different software applications or a specialized device limited to particular functions. The control unit may include any type, number, form, or configuration of processors, system memory, computer-readable mediums, peripheral devices, and operating systems. In one embodiment, the computer includes a personal computer (PC), which may be in the form of a desktop, laptop, pocket PC, personal digital assistant (PDA), tablet PC, or other known forms of personal computers. At least one access device and/or interface that allow the operator to utilize the functionality of the control unit. The access device and/or interface can include but is not limited to a keyboard 229, mouse 230, a graphical user interface (GUI) displayed in a display screen 231, and other known input or output devices and interfaces.

FIG. 5 illustrates a scan volume according to an embodiment. The 3D scanning unit 426 includes an image acquisition unit, which by a non-limiting example, includes two 2D cameras 410 and an illumination unit 402. The scan volume may be defined by an overlapping section 508 of cones (502, 504) representing field of views of individual 2D cameras 410. In some embodiments, the scan volume is only a part of the overlapping section 508 and not the entire overlapping section.

Although some embodiments have been described and shown in detail, the disclosure is not restricted to them, but may also be embodied in other ways within the scope of the subject matter defined in the following claims. In particular, it is to be understood that other embodiments may be utilized and structural and functional modifications may be made without departing from the scope of the disclosure.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

In 3D scanner claims enumerating several means, several of these means can be embodied by one and the same item of hardware. The mere fact that certain measures are recited in mutually different dependent claims or described in different embodiments does not indicate that a combination of these measures cannot be used to advantage.

It should be appreciated that reference throughout this specification to "one embodiment" or "an embodiment" or features included as "may" means that a particular feature, structure or characteristic described in connection with the embodiment is included in at least one embodiment of the disclosure. Therefore, it is emphasized and should be appreciated that two or more references to "an embodiment" or "one embodiment" or "an alternative embodiment" or features included as "may" in various portions of this specification are not necessarily all referring to the same embodiment. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art, and the generic principles defined herein may be applied to other aspects.

The invention claimed is:

1. A 3D scanner for scanning objects placed by an operator in a scan volume of the 3D scanner, where the 3D scanner comprises:
   an optical scanning unit configured for recording 3D geometry data of an object placed in the scan volume, the optical scanning unit comprising:
      a light source arranged to project a beam of probe light into the scan volume, and
      an image acquisition unit comprising at least two 2D cameras arranged to record 2D images of light received from the object placed in the scan volume; the scan volume being defined by at least a part of an overlapping section of cones representing fields of view of the individual 2D cameras, and
   a control unit comprising a data processor and a non-transitory computer readable medium encoded with a computer program product comprising readable program code being executable by the processor to cause the processor to:
      monitor the scan volume while the operator moves the object into place in the scan volume,
      detect movement of the object in the scan volume in the step of monitoring the scan volume by analyzing monitoring data acquired for the object at different points in time,
      initiate 3D scanning when the object is determined to be at rest in the scan volume, and
      generate and record a digital 3D representation of the object from the recorded geometry data after the step of initiating 3D scanning for later use.

2. The 3D scanner according to claim 1, wherein the readable program code is executable by the processor and is configured to cause the processor to:

acquire a monitoring data at least for a foreign object, present in the scan volume, at different points in time;

detect movement at least of the foreign object present in the scan volume by analyzing the monitoring data acquired at least for the foreign object at different points in time; and prevent the initiation of 3D scanning of the object when the foreign object is determined to be in motion in the scan volume.

3. The 3D scanner according to claim 1, wherein preventing the initiation of the 3D scanning of the object comprises preventing the initiation of 3D scanning of the object when the object is determined to be at rest in the scan volume and the foreign object is determined to be motion in the scan volume.

4. The 3D scanner according to claim 2, wherein preventing the initiation of the 3D scanning of the object comprises preventing the initiation of 3D scanning of the object when the object is determined to be at rest in the scan volume and the foreign object is determined to be motion in the scan volume.

5. The 3D scanner according to claim 1, wherein the monitoring data is recorded by capturing ambient light reflected by the object placed in the scan volume and/or the foreign object present in the scan volume.

6. The 3D scanner according to claim 1, wherein the monitoring data comprises monitoring 2D images of the object and foreign object recorded at different points in time when the foreign object is present in the scan volume.

7. The 3D scanner according to claim 1, wherein the monitoring data comprises monitoring 2D images of the object recorded at different points in time when the foreign object is absent from the scan volume.

8. The 3D scanner according to claim 1, wherein the monitoring data acquired for the object represents position and/or orientation of the object in the scan volume.

9. The 3D scanner according to claim 1, wherein analyzing the monitoring data comprises comparing the monitoring 2D images recorded at different points in time.

10. The 3D scanner according to claim 9, wherein the comparing the monitoring 2D images recorded at different points in time comprises comparing pixel values of pixels in the monitoring 2d images.

11. The 3D scanner according to claim 1, wherein the object is determined to be at rest in the scan volume when a difference between the compared pixel values is below a first predefined threshold value.

12. The 3D scanner according to claim 2, wherein the foreign object is determined to be in motion in the scan volume when a difference between the compared pixel values is above a second predefined threshold value.

13. The 3D scanner according to claim 1, wherein analyzing the monitoring data acquired for the object comprises deriving information relating to the position and/or orientation of the object in the scan volume from the acquired monitoring data and comparing the information derived for the monitoring data acquired at different points in time.

14. The 3D scanner according to claim 5, wherein the comparing comprises analyzing the monitoring 2D images using an image analysis algorithm.

15. The 3D scanner according to claim 14, wherein the image analysis algorithm comprises at least one of a feature recognition algorithm or an edge detection algorithm.

16. The 3D scanner according to claim 1, wherein the image acquisition unit is configured to record both the monitoring 2D images for the object and/or foreign object and scanning 2D images that are recorded during the 3D scanning for generation of the digital 3D representation of the object.

17. The 3D scanner according to claim 1, wherein analyzing the monitoring data comprises
  generating monitoring digital 3D representations of the object and/or foreign object from the monitoring data acquired for different points in time; and
  comparing relative arrangement of the generated monitoring digital 3D representations.

18. A computer program product embodied in a non-transitory computer readable medium, the computer program product comprising computer readable program code being executable by a hardware data processor for a 3D scanner having a light source arranged to project a beam of probe light into a scan volume and to cause the 3D scanner to perform a method comprising:
  detecting movement of an object placed in the scan volume of the 3D scanner by analyzing monitoring data acquired for the object at different points in time;
  determining whether the object is at rest in the scan volume;
  initiating 3D scanning when the object is determined to be at rest in the scan volume;
  performing the 3D scanning by using at least two 2D cameras arranged to record 2D images of light received from the object placed in the scan volume, the scan volume being defined by at least a part of an overlapping section of cones representing fields of view of the individual 2D cameras;
  generating and recording a digital 3D representation of the object from geometry data recorded during the 3D scanning for later use; and
  visualizing the generated digital 3D representation.

* * * * *